G. P. CARROLL & F. N. ROEHRICH.
CONTROLLING MECHANISM FOR REFRIGERATING MACHINES.
APPLICATION FILED AUG. 26, 1910.

1,096,824.

Patented May 19, 1914.
4 SHEETS—SHEET 2.

G. P. CARROLL & F. N. ROEHRICH.
CONTROLLING MECHANISM FOR REFRIGERATING MACHINES.
APPLICATION FILED AUG. 26, 1910.

1,096,824.

Patented May 19, 1914.

Witnesses:
John E. Prager
Jesse H. Swiedler

Inventors
George P. Carroll
Frank N. Roehrich

G. P. CARROLL & F. N. ROEHRICH.
CONTROLLING MECHANISM FOR REFRIGERATING MACHINES.
APPLICATION FILED AUG. 26, 1910.

1,096,824.

Patented May 19, 1914.

Witnesses:
John E. Prager
Jesse H. Swiedler

Inventors
George P. Carroll
Frank N. Roehrich

UNITED STATES PATENT OFFICE.

GEORGE P. CARROLL, OF BRIDGEPORT, CONNECTICUT, AND FRANK N. ROEHRICH, OF JERSEY CITY, NEW JERSEY; SAID ROEHRICH ASSIGNOR TO SAID CARROLL.

CONTROLLING MECHANISM FOR REFRIGERATING-MACHINES 1,096,824.　　　　　Specification of Letters Patent.　　Patented May 19, 1914.

Application filed August 26, 1910. Serial No. 579,084.

*To all whom it may concern:*

Be it known that we, GEORGE P. CARROLL and FRANK N. ROEHRICH, citizens of the United States, and residents, respectively, of Bridgeport, Fairfield county, State of Connecticut, and of Jersey City, Hudson county, State of New Jersey, have invented a new and useful Controlling Mechanism for Refrigerating-Machines, of which the following is a specification.

Our invention especially relates to improvements in mechanism for automatically operating an intermittent absorption refrigerating machine.

The purpose of our invention is to obviate the use of electrical appliances for such automatic operation and to provide an accurate, quick moving mechanical device whereby conditions of temperature and pressure, arising from the action of the refrigerating machine itself, will supply power for and effect its own control. The parts shown and described may also be used for other purposes where similar movements are desired for actuating mechanical parts. The means employed for accomplishing these purposes are set forth in the accompanying drawings and in the description relating thereto.

A back plate support 1 has cast integral with itself, at the top of its vertical center, a bracket 2 with a vertical semi-cylindrical recess in front, and, at the bottom and right of its vertical center, a bracket 3 with a vertical semi-cylindrical recess in front in axial alinement with the recess of the bracket 2. A central reciprocating rod 4, in axial alinement with the recesses of the brackets 2 and 3, has midway between its ends a squared central section, an upper smooth cylindrical section above its central section and of a little less diameter, a lower smooth cylindrical section below its central section and of a little less diameter, an upper middle threaded section above its upper smooth section and of nearly the same diameter, a lower middle threaded section below its lower smooth section and of nearly the same diameter, a top threaded section above its upper middle threaded section and of less diameter and a bottom threaded section below its lower middle threaded section and of less diameter. In the upper smooth cylindrical section of the rod 4 is a longitudinal groove 5; and in its lower smooth cylindrical section is a similar longitudinal groove 6. An upper sleeved ring 7 rather loosely surrounds the upper smooth cylindrical section of the rod 4 so that the ring at the bottom is adapted to abut against the squared central section of the rod. A screw 8 passes through a threaded opening in the front of the ring 7 and at its inner end loosely occupies the longitudinal groove 5 so as to prevent a turning of the ring and yet to permit a free forward and back movement. A lower sleeved ring 9 rather loosely surrounds the lower smooth cylindrical section of the rod 4 so that the ring at the top is adapted to abut against the squared central section of the rod. A screw 10 passes through a threaded opening in the front of the ring 9 and at its inner end loosely occupies the longitudinal groove 6 so as to prevent a turning of the ring and yet to permit a free forward and back movement. The ring 7 and the screw 8 constitute a forward collar, and the ring 9 and the screw 10 constitute a back collar. A helical compression spring 11, called the forward spring, abuts at its lower end against the ring 7 and surrounds its sleeve. An upper sleeved forward nut 12 is screwed around the upper middle threaded section of the rod 4, so as to regulate the thrust of the spring 11 as desired, and is held in position by a forward lock nut 13. A helical compression spring 14, called the back spring, abuts at its upper end against the ring 9 and surrounds its sleeve. A lower sleeved back nut 15 is screwed around the lower middle threaded section of the rod 4, so as to regulate the thrust of the spring 15 as desired, and is held in position by a back lock nut 16.

A transverse forward projection 17 is screwed around the top threaded section of the rod 4, has a horizontal arm extending to the right, with a vertical slot at its right end, and has a top in axial alinement with the rod and partially occupying the recess in the bracket 2. A semi-cylindrical cap piece 18 makes a reciprocating fit over the top of the projection 17 and is screwed at each end to the bracket 2 by screws 19. A lower reciprocating rod 20 is screwed around the bottom threaded section of the rod 4, partially occupies the recess in the bracket 3, has an integral stop collar 21 below the bracket and has above the bracket an integral transverse back projection 22 extending to the right, with a vertical slot at its right end. A semi-cylindrical cap piece 23 makes a reciprocating fit over the rod 20 between the collar 21 and the projection 22 and is screwed at each end to the bracket 3 by screws 24. Cast integral with the support 1 and between its upper end and horizontal center is an L shaped bracket 25 proceeding frontward and with one arm parallel with the face of the support. In the rear of the front arm of the bracket 25 and pivoted upon it by a screw 26 is a bell crank forward lever 27, having the free end of a short arm just above the screw 8, having its longer arm of less depth than the width of the slot in the projection 17 so that this arm can occupy the slot and having near the top end of its longer arm a forward catch 28 adapted to lock the projection when the latter is moved sufficiently downward. A light flat spring 29 secured to the bracket 25 by screws 30 tends to cause the catch 28 to approach the projection 17 and results in the catch engaging the projection when the rod 4 is depressed sufficiently on a back movement. Cast integral with the support 1 and between its lower end and horizontal center is another L shaped bracket 31 proceeding frontward and with one arm parallel with the face of the support. In the rear of the front arm of the bracket 31 and pivoted upon it by a screw 32 is a bell crank back lever 33, having the free end of a short arm just below the screw 10, having its longer arm of less depth than the width of the slot in the projection 22 so that this arm can occupy the slot and having near the bottom end of its longer arm a back catch 34 adapted to lock the projection when the latter is moved sufficiently upward. A light flat spring 35 secured to the bracket 31 by screws 36 tends to cause the catch 34 to approach the projection when the rod 4 is elevated sufficiently on a forward movement. Since the long arms of the levers 27 and 33 are naturally the heavier, with the rod 4 in a horizontal position, the extra weight of metal in the long arms would be sufficient to cause the catches 28 and 34 to approach the projections 17 and 22. But since the mechanism is especially intended to operate in the vertical position shown, we provide the springs 29 and 35 in preference to increased weights of metal in the short arms of the levers 27 and 33. Furthermore, in any position, the springs 29 and 35 act more quickly than would weights.

Cast integral with the support 1 at its left front toward the top is a projection 37 with a vertical cylindrical opening. Cast integral with the support 1 at its left near the bottom is another projection 38 with a vertical cylindrical opening in axial alinement with the opening in the projection 37. An actuating rod 39 is free to reciprocate within the openings in the projections 37 and 38. A motor arm 40 has at one end a collar surrounding the rod 39 between the projections 37 and 38, is secured to the rod by a pin 41, and at its other end has a square jawed fork inclosing the squared central section of the rod 4 just above the ring 9.

At the right of the approximate horizontal center of the support 1 is a cylindrical hub 42, having a frontward threaded bolt pocket. Pivoted adjacent to the hub 42 is a centrally pivoted actuating lever 43, having at the free end of its inner and actuating arm 44 a square pivoted fork inclosing the squared central section of the rod 4 between the ring 7 and the arm 40, and having its outer arm below the center line of the inner arm and provided at its free end with a frontward extending stop projection 45. Cast integral with the support 1 below and to the left of the hub 42 is a projection 46 with a vertical cylindrical opening. Reciprocating in the opening in the projection 46 is a rather long rod 47, with an integral collar 48 below the projection. Surrounding the rod 47 between the projection 46 and the collar 48 is a light helical compression spring 49. A head 50 is threaded on to the rod 47 above the projection 46. Pivoted in front of and adjacent to the lever 43 is a centrally pivoted actuating lever 51, having a longer arm extending outward and adapted to bear down on the projection 45 and having opposite at the free end of its inner arm 52 a square jawed fork inclosing the rod 47 between the projection 46 and the head 50. A bolt 53 serves as the common pivot for the levers 51 and 43 and is secured in the bolt pocket of the hub 42.

Figure 1:
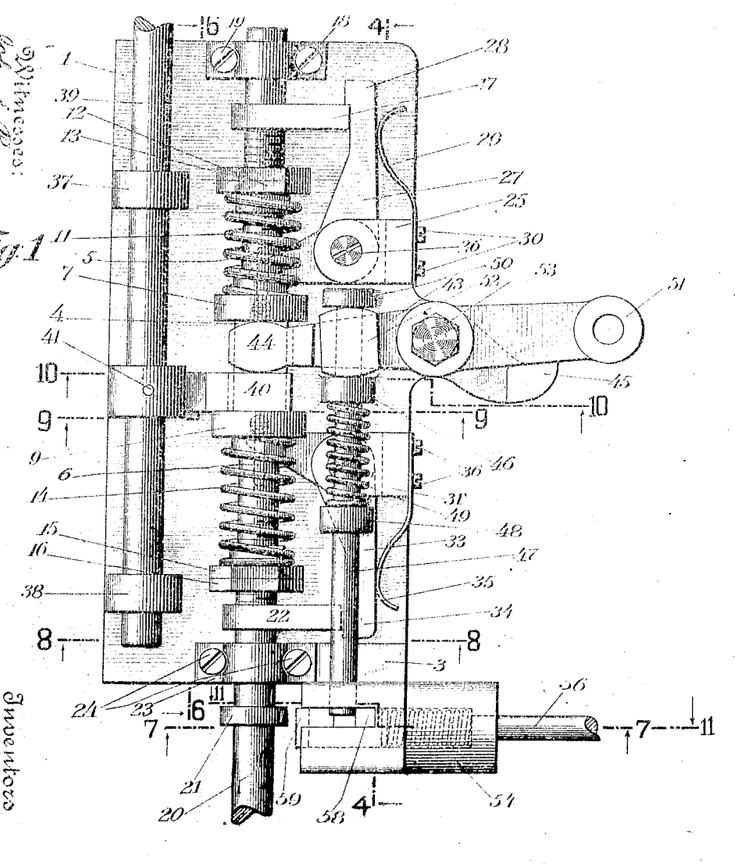
Figure 1 is a front elevation of our invention.
Figure 2:
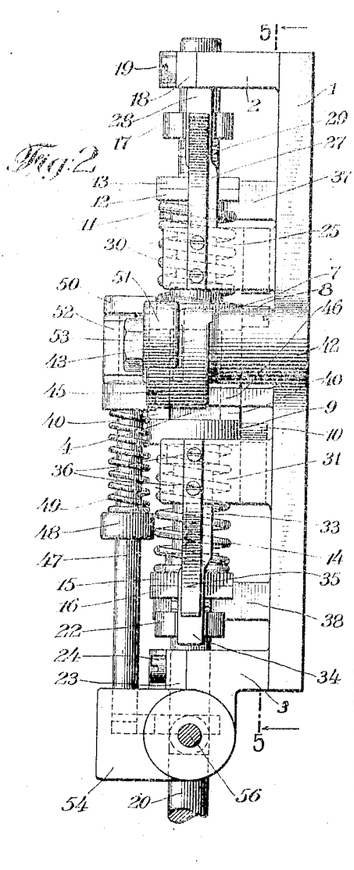
Fig. 2 is a right end elevation of the structure of the preceding figure.
Figure 3:
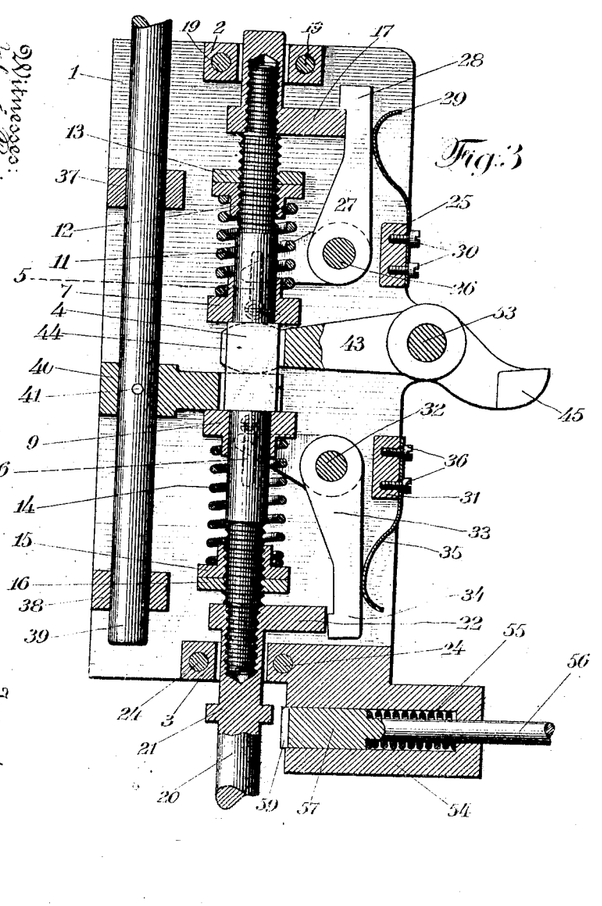
Fig. 3 is a partial front elevation and a partial vertical section of the same structure.
Figure 4:
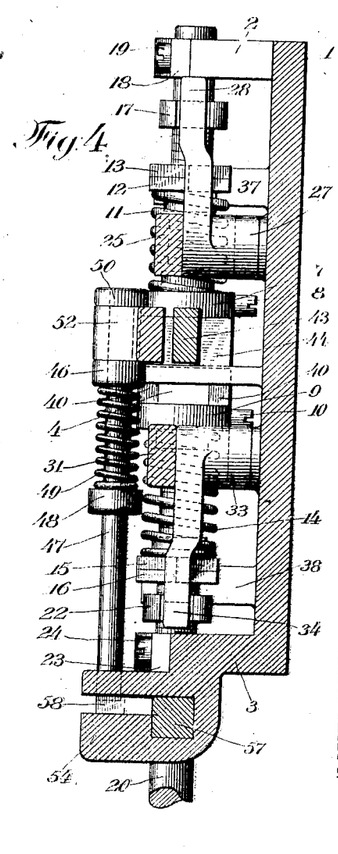
Fig. 4 is a vertical section through the line 4—4 of Fig. 1, looking toward the left.
Figure 5:
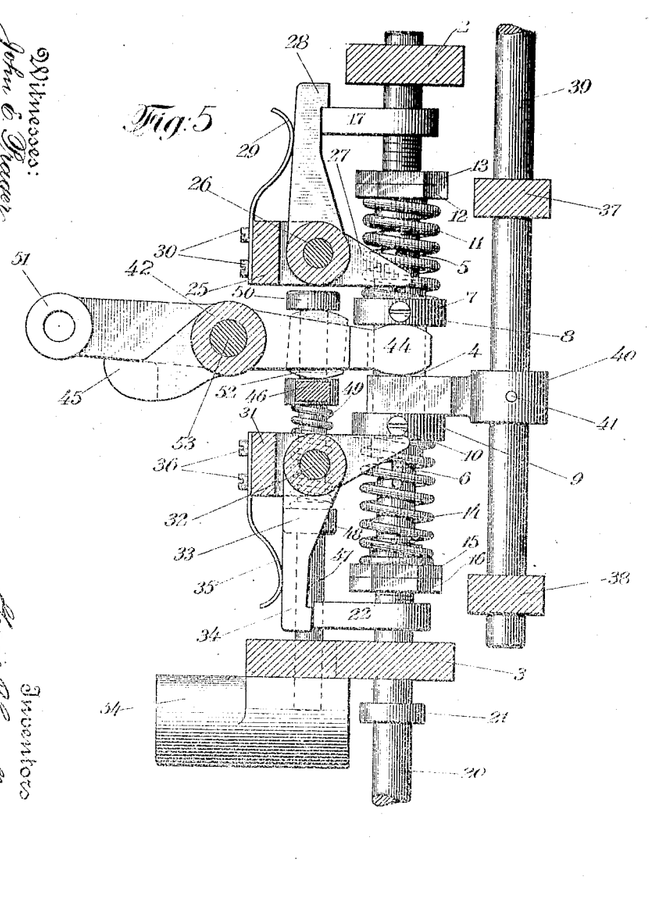
Fig. 5 is a partial back elevation and a partial vertical section through the line 5—5 of Fig. 2, looking toward the left.
Figure 6:
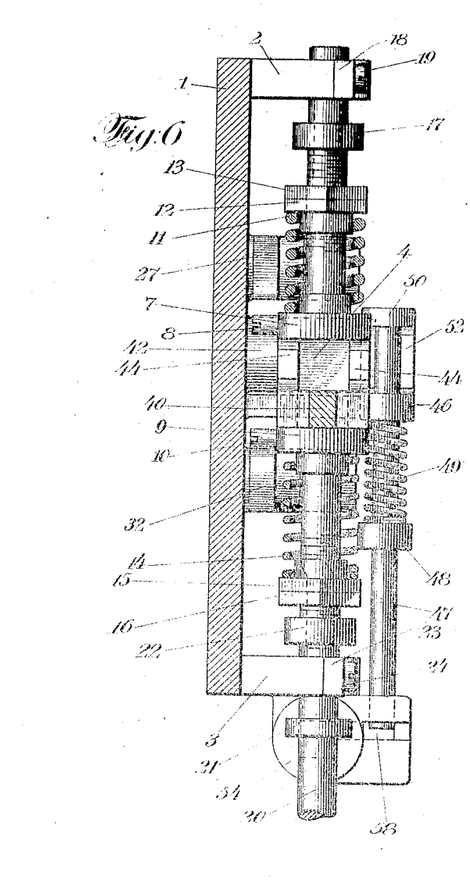
Fig. 6 is a vertical section through the line 6—6 of Fig. 1, looking toward the right.
Figures 7, 8, 9, 10, 11:
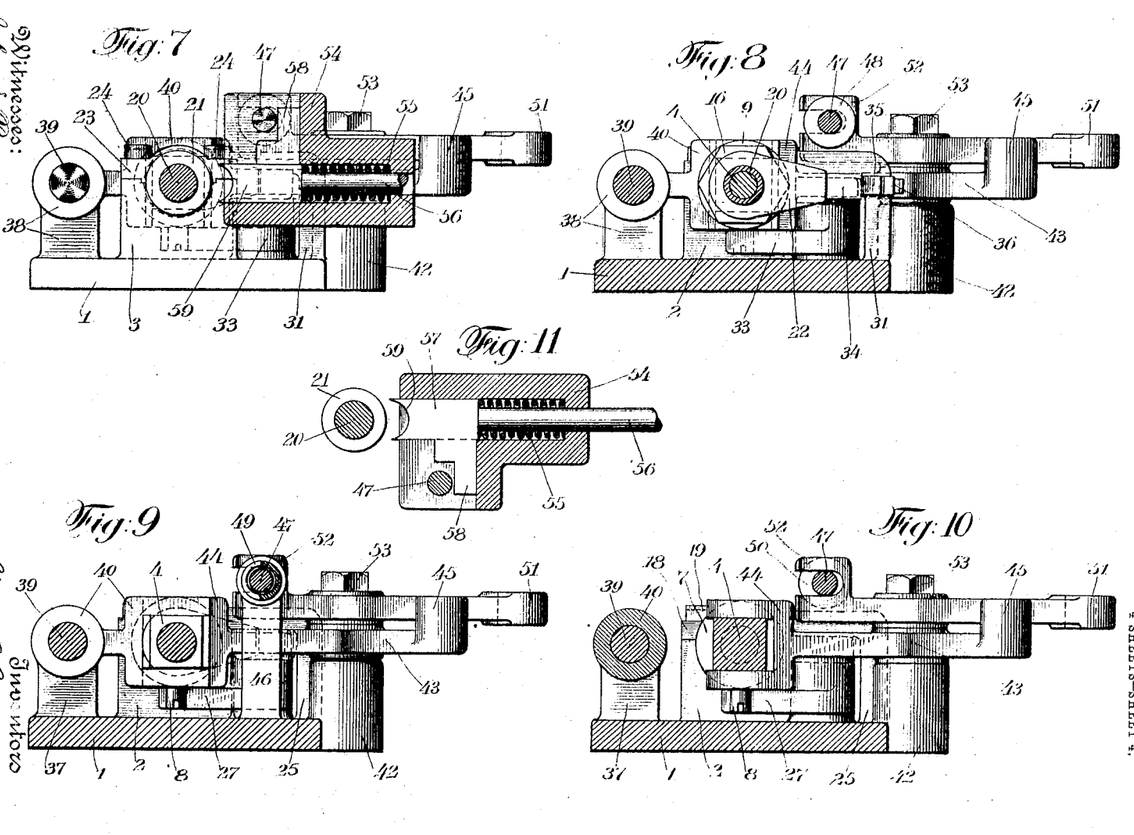
Fig. 7 is a partial horizontal section through the line 7—7 of Fig. 1, looking upward and with some of the parts shown in full.
Fig. 8 is a horizontal section through the line 8—8 of Fig. 1, looking upward.
Fig. 9 is a horizontal section through the line 9—9 of Fig. 1, looking upward.
Fig. 10 is a horizontal section through the line 10—10 of Fig. 1, looking upward.
Fig. 11 is a partial horizontal section through the line 11—11 of Fig. 1, looking downward and with some of the parts in plan view.

Cast integral with the bracket 3 below and in front and in part extending to the right is an extension 54, having a rectangular cavity extending from the front to a vertical plane, which, if extended to the left, would pass back of the rod 20. From this cavity in the extension 54 a squared cavity extends nearly to the right end of the extension and in the right end wall thus formed is a cylindrical rod opening axially in the same plane as the axis of the rod 20. The upper left surface of the extension 54 has a vertical cylindrical opening, down into the rectangular cavity of the extension, in which the lower end of the rod 47 reciprocates. Occupying the squared cavity in the extension 54 and abutting against its wall at the right is a helical compression spring 55. Extending through the opening 55 and the opening in the wall at its right is a locking rod 56, having integral with itself a head 57 adapted to reciprocate in the rectangular cavity of the extension 54. The head 57 has in front an extension 58, that, when the rod 56 is in its extreme right position, as shown in Figs. 7 and 11, is pressed against the lower end of the rod 47 by the spring 55 and is locked by the rod 47, and that, when the rod 56 is in its extreme left position, locks underneath the lower end of the rod 47. The head 57 has in back a semi-cylindrical jaw 59, that, when the rod 56 is in its extreme right position, is free of the rod 20 and the collar 21; but that, when the rod 56 is in its extreme left position, locks under the collar 21 against the rod 20.

The method of operation is as follows: It is assumed that ordinarily the lever 51 is inactive and idly rests on the projection 45. Under such circumstances the lever arm 44, so far as being operated through its projection 45, is also inactive. It is also assumed that ordinarily the mechanism is under the control of the rod 39, which, by the application of force in a manner not shown, is gradually moved up and down successively. Then, with all the parts at the beginning of an ordinary cycle of operation substantially in the position shown, on a gradual up movement of the rod 39, the actuating arm 40 gradually moves forward. This movement of the arm 40 gradually moves forward the arm 44 and the ring 7; gradually depresses the projection 45 still more below the lever 51; and gradually compresses the spring 11 until finally the screw 8 bears hard against the adjacent short arm of the lever 27. Thereupon the catch 28 suddenly flies to the right, overcoming the slight opposition of the spring 29, and releases the projection 17; and the spring 11, acting upon the nut 12, quickly forces the rods 4 and 20 forward so that the catch 34, pressed to the left by the spring 35, locks the projection 22. In this forward movement the spring 14 is also somewhat compressed by the nut 15. Then on a subsequent gradual down movement of the rod 39, the actuating arm 40 gradually moves back. This movement of the arm 40 gradually moves back the ring 9 and the arm 44, the ring 7 directly acting on the arm 44; gradually raises the projection 45 into approximate contact with the lever 51; and gradually compresses the spring 14 until finally the screw 10 bears hard against the adjacent short arm of the lever 33. Thereupon the catch 34 suddenly flies to the right, overcoming the slight opposition of the spring 35, and releases the projection 22; and the spring 14, acting upon the nut 15, quickly forces the rods 4 and 20 back so that the catch 28, pressed to the left by the spring 29, locks the projection 17. In this back movement the spring 11 is also somewhat compressed by the nut 12. This completes the ordinary cycle of operation. It is to be noted that, as the lever 51 remains inactive during the ordinary cycle of operation, the extension 58 continues to be locked by the rod 47 so that the jaw 59 cannot interfere with the forward and back movement of the rod 20.

Assume now that an occasional cycle of operation begins. Force, in a manner not shown, is applied to gradually move the outer arm of the lever 51 downward. With the parts in the positions shown, this movement has already begun, without, however, thus far interrupting any part of the ordinary cycle of operation. But as the outer arm of the lever 51 continues to be moved downward, it lifts the arm 52, the head 50 and the rod 47 so far that the extension 58, forced by the spring 55; slides under the rod 47 and the jaw 59 bears against the collar 21, or against the rod 20 under the collar 21, according to the back or forward position of the rod 20. Simultaneously, as the outer arm of the lever 51 continues to be moved downward, it bears down upon the projection 45. This action upon the projection 45 gradually moves forward the arm 44 and the ring 7; gradually moves forward the arm 40, the ring 9 directly acting on the arm 40; and gradually compresses the spring 11 until finally the screw 8 bears hard against the adjacent short arm of the lever 27. Thereupon the catch 28 suddenly flies to the right, overcoming the slight opposition of the spring 29, and releases the projection 17; and the spring 11, acting upon the nut 12, quickly forces the rods 4 and 20 forward so that the catch 34, pressed to the left by the spring 35, locks the projection 22. In this forward movement also the spring 14 is somewhat compressed by the nut 15; and the jaw 59, if not already under the collar 21, is forced by the spring 55 into a locking position under the collar. The rods 4 and 20, on this forward movement, are thus locked both by the latch 34 and by the jaw 59. Accordingly when presently, as is assumed, the force applied to the outer arm of the lever 51 is withdrawn and the control of the rod 4 is restored, so far as the lever 51 is concerned, to the arm 40; it happens that the arm 40 cannot as yet be moved back by a downward movement of the rod 39; but the parts are rigidly held in the forward position by the jaw 59. Just as soon, however, as the rod 56 is moved to the right, by a force applied to it in a manner not shown, the spring 55 is compressed; the jaw 59 releases the rod 20 and the collar 21; and the extension 58 is slid to the right from under the rod 47. When the extension 58 passes from under the rod 47, the rod 51 being inactive, the spring 49 forces the rod 47 downward to the left of the extension 58. Consequently, when the force that moved the rod 56 to the right is now withdrawn, the spring 55 forces the extension 58 against the lower end of the rod 47 substantially as shown. The occasional cycle of operation is thus complete and the control of the rods 4 and 20 is fully restored to the arm 40. In this occasional cycle of operation it is also assumed that the downward force applied to the outer arm of the lever 51 is stronger than any force applied to the arm 39 to force the latter downward. Consequently the position of the rod 4 at the beginning of the occasional cycle, whether in an extreme forward, or in an extreme back or in some intermediate position, is immaterial. And it is to be noted that the forward operative effect of the arm 44, when actuated by the lever 51, upon the rod 4 and its connected moving parts, is precisely the same as the forward operative effect of the arm 40 when the rod 39 is moved upward.

When our mechanism is made a constituent part of an automatic intermittent absorption refrigerating machine, the rod 39 is operatively connected to a thermostat in the refrigerator, so that, as the temperature near the thermostat gradually falls, the rod 39 is gradually moved up until at a predetermined temperature limit the lever 27 is sprung as described, the nut 12 being adjusted so that the lever springs at the desired temperature limit; and so that as such temperature gradually rises the rod 39 is gradually moved down until at a predetermined high temperature limit the lever 33 is sprung as described, the nut 15 being adjusted so that the lever springs at the desired temperature limit. Also under such circumstances, the rod 20 is operatively connected both to a valve controlling the flow of refrigerant through an expansion coil and to a valve controlling the flow of cooling water to a still, so that, when the rod 20 is quickly moved forward, these valves are closed, and that, when the rod 20 is quickly moved back, these valves are opened. Also under such circumstances, the outer end of the lever 51 is operatively connected to a device that, upon an approximate exhaustion of the supply of refrigerant in a refrigerant reservoir, moves the outer end of the lever 51 downward, as described, and that, upon gaseous refrigerant under sufficient pressure being expelled into the reservoir from a still, moves this outer end upward again. And also under such circumstances, the rod 56 is operatively connected to apparatus for heating the still, so that, when, as described, the jaw 59 blocks the rod 20, the rod 56 turns on heat to the still; and so that, after the automatic termination of each such heating of the still and after the temperature of the still has fallen say to 110° F., the rod 56 is moved to its original position to the right, as shown. However slow may be the movements imparted to the arms 40 and 44, the resultant movements of the rods 20 and 56 are very quick. At the completion of each movement of the rods 20 and 56 they are held in their respective positions until the time arrives for the next movement. All parts are so correlated that force transmitted through the arms 40 and 44 accomplishes the desired resultant movements of the rods 20 and 56 in proper order, by positive action and with precision. The thrust of the springs 11, 14 and 49 is easily adjusted. And all parts of the mechanism are easily accessible.

What we have invented and what we desire to have protected by Letters Patent is expressed in claims as follows:

1. In combination a movable member, a locking device having a catch locking said member on a back movement thereof, a striker on being moved forward operating on said device to unlock its catch from said member, and means for moving said striker and member forward and back.

2. In combination a movable member, a forward locking device having a catch locking said member on a back movement thereof, a back locking device having a catch locking said member on a forward movement thereof, a forward striker on being moved forward operating on said forward device to unlock its catch from said member, a back striker on being moved back operating on said back device to unlock its catch from said member, and means for moving said strikers and member forward and back.

3. In combination a movable member, a locking device having a catch locking said member on a back movement thereof, a striker adapted to slide along said member and on being moved forward thereon operating on said device to unlock its catch from the member, and means for moving said striker forward and then said member forward upon such unlocking and for subsequently moving them back.

4. In combination a movable member, a forward locking device having a catch locking said member on a back movement thereof, a back locking device having a catch locking said member on a forward movement thereof, a forward striker adapted to slide along said member and on being moved forward thereon operating on said forward device to unlock its catch from the member, a back striker adapted to slide along said member and on being moved back thereon operating on said back device to unlock its catch from the member, and means for moving said strikers forward and then said member forward upon such forward unlocking and for subsequently moving said strikers back and then said member back upon such back unlocking.

5. In combination a movable member, a pivoted bell crank lever having the free end of one arm adjacent to said member and on its other arm a catch for locking the member, means causing said catch to lock said member on a back movement thereof, a striker on being moved forward operating on said adjacent lever arm to unlock its catch from said member, and means for moving said striker and member forward and back.

6. In combination a movable member, a pivoted bell crank forward lever having the free end of one arm adjacent to said member and on its other arm a forward catch for locking the member, a pivoted bell crank back lever having the free end of one arm adjacent to said member and on its other arm a back catch for locking the member, means causing said forward catch to lock said member on a back movement thereof and said back catch to lock the member on a forward movement thereof, a forward striker on being moved forward operating on said adjacent forward lever arm to unlock its catch from said member, a back striker on being moved back operating on said adjacent back lever arm to unlock its catch from said member, and means for moving said strikers and member forward and back.

7. In combination a movable member, a pivoted bell crank lever having the free end of one arm adjacent to said member and on its other arm a catch for locking the member, means causing said catch to lock said member on a back movement thereof, a striker adapted to slide along said member and on being moved forward thereon operating on said adjacent lever arm to unlock its catch from the member, and means for moving said striker forward and then said member forward upon such unlocking and for subsequently moving them back.

8. In combination a movable member, a pivoted bell crank forward lever having the free end of one arm adjacent to said member and on its other arm a forward catch for locking the member, a pivoted bell crank back lever having the free end of one arm adjacent to said member and on its other arm a back catch for locking the member, means causing said forward catch to lock said member on a back movement thereof and said back catch to lock the member on a forward movement thereof, a forward striker adapted to slide along said member and on being moved forward thereon operating on said adjacent forward lever arm to unlock its catch from the member, a back striker adapted to slide along said member and on being moved back thereon operating on said adjacent back lever arm to unlock its catch from the member, and means for moving said strikers forward and then said member forward upon such forward unlocking and for subsequently moving said strikers back and then the member back upon such back unlocking.

9. In combination a movable member having a transverse forward projection and a transverse back projection, a forward locking device having a catch locking said forward projection on a back movement of said member, a back locking device having a catch locking said back projection on a forward movement of said member, a forward striker on being moved forward operating on said forward device to unlock its catch from said forward projection, a back striker on being moved back operating on said back device to unlock its catch from said back projection, and means positioned between said projections for moving said strikers and member forward and back.

10. In combination a movable member having a transverse forward projection and a transverse back projection, a forward locking device having a catch locking said forward projection on a back movement of said member, a back locking device having a catch locking said back projection on a forward movement of said member, a forward striker adapted to slide along said member and on being moved forward thereon operating on said forward device to unlock its catch from said forward projection, a back striker adapted to slide along said member and on being moved back thereon operating on said back device to unlock its catch from said back projection, and means positioned between said projections for moving said strikers forward and then said member forward upon such forward unlocking and for subsequently moving said strikers back and then said member back upon such back unlocking.

11. In combination a movable member having a transverse forward projection and a transverse back projection, a pivoted bell crank forward lever having the free end of one arm adjacent to said member and on its other arm a forward catch for locking said forward projection, a pivoted bell crank back lever having the free end of one arm adjacent to said member and on its other arm a back catch for locking said back projection, means causing said forward catch to lock said forward projection on a back movement of said member and said back catch to lock said back projection on a forward movement of said member, a forward striker on being moved forward operating on said adjacent forward lever arm to unlock said forward catch from said forward projection, a back striker on being moved back operating on said adjacent back lever arm to unlock said back catch from said back projection, and means positioned between said projections for moving said strikers and member forward and back.

12. In combination a movable member having a transverse forward projection and a transverse back projection, a pivoted bell crank forward lever having the free end of one arm adjacent to said member and on its other arm a forward catch for locking said forward projection, a pivoted bell crank back lever having the free end of one arm adjacent to said member and on its other arm a back catch for locking said back projection, means causing said forward catch to lock said forward projection on a back movement of said member and said back catch to lock said back projection on a forward movement of said member, a forward striker adapted to slide along said member and on being moved forward thereon operating on said adjacent forward lever arm to unlock said forward catch from said forward projection, a back striker adapted to slide along said member and on being moved back thereon operating on said adjacent back lever arm to unlock said back catch from said back projection, and means positioned between said projections for moving said strikers forward and then said member forward upon such forward unlocking and for subsequently moving said strikers back and then said member back upon such back unlocking.

13. In combination a movable member, a pivoted bell crank lever having one arm adjacent to said member and on its other arm a catch for locking the member, a positioning spring pressing said catch into locking contact with said member on a back movement thereof, a striker on being moved forward operating on said adjacent lever arm to unlock its catch from said member, and means for moving said striker and member forward and back.

14. In combination a movable member, a pivoted bell crank forward lever having the free end of one arm adjacent to said member and on its other arm a forward catch for locking the member, a pivoted bell crank back lever having the free end of one arm adjacent to said member and on its other arm a back catch for locking the member, a positioning forward spring pressing said forward catch into locking contact with said member on a back movement thereof, a positioning back spring pressing said back catch into locking contact with said member on a forward movement thereof, a forward striker on being moved forward operating on said adjacent forward lever arm to unlock its catch from said member, a back striker on being moved back operating on said adjacent back lever arm to unlock its catch from said member, and means for moving said strikers and member forward and back.

15. In combination a movable member, a locking device having a catch locking said member on a back movement thereof, a striker on being moved forward operating on said locking device to unlock its catch from said member, a spring device resisting the forward movement of said striker and tending to move it back but on being compressed to a predetermined limit permitting the striker to so operate and thereupon causing said member to spring forward free of said catch, and means for moving said striker forward and so compressing said spring device and then for releasing the striker and moving said member back.

16. In combination a movable member, a forward locking device having a catch locking said member on a back movement thereof, a back locking device having a catch locking said member on a forward movement thereof, a forward striker on being moved forward operating on said forward locking device to unlock its catch from said member, a back striker on being moved back operating on said back locking device to unlock its catch from said member, a forward spring device resisting the forward movement of said forward striker and tending to move it back but on being compressed to a predetermined limit permitting the forward striker to so operate and thereupon causing said member to spring forward free of said forward catch, a back spring device resisting the back movement of said back striker and tending to move it forward but on being compressed to a predetermined limit permitting the back striker to so operate and thereupon causing said member to spring back free of said back catch, and means for moving said forward striker forward, so compressing said forward spring device and releasing said back striker and then for moving said back striker back, so compressing said back spring device and releasing said forward striker.

17. In combination a movable member having a transverse projection, a locking device having a catch for locking said projection on a back movement of said member; a striker on being moved forward operating on said locking device to unlock its catch from said projection, a helical compression spring in front of and bearing upon said striker, a nut secured to said member back of said projection and bearing upon the front end of said spring, and means for moving said striker forward and then releasing it and moving said member back.

18. In combination a movable member having a transverse forward projection and a transverse back projection, a forward locking device having a catch locking said forward projection on a back movement of said member, a back locking device having a catch locking said back projection on a forward movement of said member, a forward striker on being moved forward operating on said forward locking device to unlock its catch from said forward projection, a back striker on being moved back operating on said back locking device to unlock its catch from said back projection, a helical compression forward spring in front of and bearing upon said forward striker, a helical compression back spring back of and bearing upon said back striker, a forward nut secured to said member back of said forward projection and bearing upon the front end of said forward spring, a back nut secured to said member in front of said back projection and bearing upon the back of said back spring, and means for moving said forward striker forward and releasing said back striker and then for moving said back striker back and releasing said forward striker.

19. In combination a movable member, a locking device having a catch locking said member on a back movement thereof, a striker adapted to slide along said member and on being moved forward thereon operating on said locking device to unlock its catch from the member, a spring device resisting the forward movement of said striker and tending to move it back but on being compressed to a predetermined limit permitting the striker to so operate and thereupon causing said member to spring forward free of said catch, and means for moving said striker forward and so compressing said spring device and then for releasing the striker and moving said member back.

20. In combination a movable member, a forward locking device having a catch locking said member on a back movement thereof, a back locking device having a catch locking said member on a forward movement thereof, a forward striker adapted to slide along said member and on being moved forward thereon operating on said forward locking device to unlock its catch from the member, a back striker adapted to slide along said member and on being moved back thereon operating on said back locking device to unlock its catch from the member, a forward spring device resisting the forward movement of said forward striker and tending to move it back but on being compressed to a predetermined limit permitting the forward striker to so operate and thereupon causing said member to spring forward free of said forward catch, a back spring device resisting the back movement of said back striker and tending to move it forward but on being compressed to a predetermined limit permitting the back striker to so operate and thereupon causing said member to spring back free of said back catch, and means for moving said forward striker forward, so compressing said forward spring device and releasing said back striker and then for moving said back striker back, so compressing said back spring device and releasing said forward striker.

21. In combination a movable member having a transverse projection, a locking device having a catch locking said projection on a back movement of said member, a striker adapted to slide along said member and on being moved forward thereon operating on said locking device to unlock its catch from said projection, a helical compression spring in front of and bearing upon said striker, a nut secured to said member back of said projection and bearing upon the front end of said spring, and means for moving said striker forward and then releasing it and moving said member back.

22. In combination a movable member having a transverse forward projection and a transverse back projection, a forward locking device having a catch locking said forward projection on a back movement of said member, a back locking device having a catch locking said back projection on a forward movement of said member, a forward striker adapted to slide along said member and on being moved forward thereon operating on said forward locking device to unlock its catch from said forward projection, a back striker adapted to slide along said member and on being moved back thereon operating on said back locking device to unlock its catch from said back projection, a helical compression forward spring in front of and bearing upon said forward striker, a helical compression back spring back of and bearing upon said back striker, a forward nut secured to said member back of said forward projection and bearing upon the front end of said forward spring, a back nut secured to said member in front of said back projection and bearing upon the back end of said back spring, and means for moving said forward striker forward and releasing said back striker and then for moving said back striker back and releasing said forward striker.

23. In combination a movable member, motor means for moving said member forward and back, positioning means operative to temporarily suspend the operativeness of said motor means and to move said member forward if in a back position or to temporarily hold it in a forward position if already there, locking means locking said member in its forward position after such action of said positioning means, and means for subsequently unlocking said member.

24. In combination a movable member, motor means for moving said member forward and back, positioning means operative to temporarily suspend the operativeness of said motor means and to move said member forward if in a back position or to temporarily hold it in a forward position if already there, locking means locking said member in its forward position after such action of said positioning means, means for subsequently unlocking said member, and means causing the forward movement of said member resulting from an action of said motor means to occur with a quickness independent of the rate of movement of the motor means.

25. In combination a movable member, motor means for moving said member forward and back, positioning means operative to temporarily suspend the operativeness of said motor means and to move said member forward if in a back position or to temporarily hold it in a forward position if already there, locking means locking said member in its forward position after such action of said positioning means, means for subsequently unlocking said member, and means causing the forward movement of said member resulting from an action of said positioning means to occur with a quickness independent of the rate of movement of the positioning means.

26. In combination a movable member, motor means for moving said member forward and back, positioning means operative to temporarily suspend the operativeness of said motor means and to move said member forward if in a back position or to temporarily hold it in a forward position if already there, locking means locking said member in its forward position after such action of said positioning means, means for subsequently unlocking said member, and means causing the back movement of said member resulting from an action of said motor means to occur with a quickness independent of the rate of movement of the motor means.

27. In combination a movable member, motor means for moving said member forward and back, positioning means operative to temporarily suspend the operativeness of said motor means and to move said member forward if in a back position or to temporarily hold it in a forward position if already there, locking means locking said member in its forward position after such action of said positioning means, means for subsequently unlocking said member, and means causing the forward and back movements of said member to occur with a quickness independent of the rate of movement of said motor and positioning means.

28. In combination a movable member, motor means for moving said member forward and back, positioning means operative to temporarily suspend the operativeness of said motor means and to move said member forward if in a back position or to temporarily hold it in a forward position if already there, and means causing the forward movement of said member resulting from an action of said motor means to occur with a quickness independent of the rate of movement of the motor means.

29. In combination a movable member, motor means for moving said member forward and back, positioning means operative to temporarily suspend the operativeness of said motor means and to move said member forward if in a back position or to temporarily hold it in a forward position if already there, and means causing the forward movement of said member resulting from an action of said positioning means to occur with a quickness independent of the rate of movement of the positioning means.

30. In combination a movable member, motor means for moving said member forward and back, positioning means operative to temporarily suspend the operativeness of said motor means and to move said member forward if in a back position or to temporarily hold it in a forward position if already there, and means causing the back movement of said member resulting from an action of said motor means to occur with a quickness independent of the rate of movement of the motor means.

31. In combination a movable member, motor means for moving said member forward and back, positioning means operative to temporarily suspend the operativeness of said motor means and to move said member forward if in a back position or to temporarily hold it in a forward position if already there, and means causing the forward and back movements of said member to occur with a quickness independent of the rate of movement of said motor and positioning means.

32. In combination a movable member having a lockable catch, a forward locking device having a catch locking said member on a back movement thereof, a back locking device having a catch locking said member on a forward movement thereof, a forward striker on being moved forward operating on said forward locking device to unlock its catch from said member, a back striker on being moved back operating on said back locking device to unlock its back catch from said member, a forward spring device resisting the forward movement of said forward striker and tending to move it back but on being compressed to a predetermined limit permitting the forward striker to so operate and thereupon causing said member to spring forward free of said forward catch, a back spring device resisting the back movement of said back striker and tending to move it forward but on being compressed to a predetermined limit permitting the back striker to so operate and thereupon causing said member to spring back free of said back catch, a motor arm adjacent to said strikers, an actuating arm adjacent to said strikers, said motor arm being adapted to cause successive forward and back movements of said strikers and said actuating arm being operative to temporarily suspend the operativeness of said motor arm and to cause a forward movement of said strikers if in a back position or to temporarily hold said forward striker in a forward position if already there, positioning means operative to cause said actuating arm to so operate, locking mechanism tending to lock said lockable catch when said member is in a forward position, preventing means tending to prevent such locking by said locking mechanism but permitting it so to act when said positioning means acts as stated, and means for subsequently unlocking said lockable catch and restoring said locking mechanism to the control of said preventing means.

33. In combination a movable member having a transverse forward projection, a transverse back projection and a lockable catch, a forward locking device having a catch locking said forward projection on a back movement of said member, a back locking device having a catch locking said back projection on a forward movement of said member, a forward striker on being moved forward operating on said forward locking device to unlock its catch from said forward projection, a back striker on being moved back operating on said back locking device to unlock its catch from said back projection, a helical compression forward spring in front of and bearing upon said forward striker, a helical compression back spring back of and bearing upon said back striker, a forward nut secured to said member back of said forward projection and bearing upon the front end of said forward spring, a back nut secured to said member in front of said back projection and bearing upon the back end of said back spring, a motor arm adjacent to said strikers, an actuating arm adjacent to said strikers, said motor arm being adapted to cause successive forward and back movements of said strikers and said actuating arm being operative to temporarily suspend the operativeness of said motor arm and to cause a forward movement of said strikers if in a back position or to temporarily hold said forward striker in a forward position if already there, positioning means operative to cause said actuating arm to so operate, locking mechanism tending to lock said lockable catch when said member is in a forward position, preventing means tending to prevent such locking by said locking mechanism but permitting it so to act when said positioning means acts as stated, and means for subsequently unlocking said lockable catch and restoring said locking mechanism to the control of said preventing means.

34. In combination a movable member having a lockable catch, a forward locking device having a catch locking said member on a back movement thereof, a back locking device having a catch locking said member on a forward movement thereof, a forward striker adapted to slide along said member and on being moved forward thereon operating on said forward locking device to unlock its catch from said member, a back striker adapted to slide along said member and on being moved back thereon operating on said back locking device to unlock its catch from said member, a forward spring device resisting the forward movement of said forward striker and tending to move it back but on being compressed to a predetermined limit permitting the forward striker to so operate and thereupon causing said member to spring forward free of said forward catch, a back spring device resisting the back movement of said back striker and tending to move it forward but on being compressed to a predetermined limit permitting the back striker to so operate and thereupon causing said member to spring back free of said back catch, a motor arm between said strikers, adjacent to one of them and adapted to be moved forward and back, an actuating arm between and adjacent to said motor arm and the other of said strikers, positioning means operative to move forward said actuating arm if in a back position or to hold it in a forward position if already there, locking mechanism tending to lock said lockable catch when said member is in a forward position, preventing means tending to prevent such locking by said locking mechanism but permitting it so to act when said positioning means acts as stated, and means for subsequently unlocking said lockable catch and restoring said locking mechanism to the control of said preventing means.

35. In combination a movable member having a transverse forward projection, a transverse back projection and a lockable catch, a forward locking device having a catch locking said forward projection on a back movement of said member, a back locking device having a catch locking said back projection on a forward movement of said member, a forward striker adapted to slide along said member and on being moved forward thereon operating on said forward locking device to unlock its catch from said forward projection, a back striker adapted to slide along said member and on being moved back thereon operating on said back locking device to unlock its catch from said projection, a helical compression forward spring in front of and bearing upon said forward striker, a helical compression back spring back of and bearing upon said back striker, a forward nut secured to said member back of said forward projection and bearing upon the front end of said forward spring, a back nut secured to said member in front of said back projection and bearing upon the back end of said back spring, a motor arm between said strikers, adjacent to one of them and adapted to be moved forward and back, an actuating arm between and adjacent to said motor arm and the other of said strikers, positioning means operative to move forward said actuating arm if in a back position or to hold it in a forward position if already there, locking mechanism tending to lock said lockable catch when said member is in a forward position, preventing means tending to prevent such locking by said locking mechanism but permitting it so to act when said positioning means acts as stated, and means for subsequently unlocking said lockable catch and restoring said locking mechanism to the control of said preventing means.

36. In combination an operable member, a forward locking device having a catch locking said member on a back movement thereof, a back locking device having a catch locking said member on a forward movement thereof, intermediate mechanism on being moved forward operating through said forward locking device to unlock its catch from said member and to move the member forward and on being moved back operating through said back locking device to unlock its catch from the member and to move the member back, an actuating arm operative to move forward said mechanism if in a back position or to maintain it in a forward position if already there, a motor arm for moving said actuating arm and said mechanism forward and back, positioning means for causing said actuating arm to so operate and to withdraw the control thereof from said motor arm, means locking said member in the forward position caused or maintained by said positioning means, and means for subsequently unlocking said member and restoring the control of said actuating arm to said motor arm.

37. In combination an operable member, a forward locking device having a catch locking said member on a back movement thereof, a back locking device having a catch locking said member on a forward movement thereof, intermediate mechanism on being moved forward operating through said forward locking device to unlock its catch from said member and to move the member forward with a quickness independent of its own rate of motion and on being moved back operating through said back locking device to unlock its catch from said member and to move the member back with a like quickness, an actuating arm operative to move forward said mechanism if in a back position or to maintain it in forward position if already there, a motor arm for moving said actuating arm and said mechanism forward and back, positioning means for causing said actuating arm to so operate and to withdraw the control thereof from said motor arm, means locking said member in the forward position caused or maintained by said member, and means for subsequently unlocking said member and restoring the control of said actuating arm to said motor arm.

38. In combination an operable member, a forward locking device having a catch locking said member on a back movement thereof, a back locking device having a catch locking said member on a forward movement thereof, intermediate mechanism on being moved forward operating through said forward locking device to unlock its catch from said member and to move the member forward and on being moved back operating through said back locking device to unlock its catch from said member and to move the member back, a centrally pivoted actuating lever having its inner arm operative to move forward said mechanism if in a back position or to maintain it in a forward position if already there, a motor arm for moving said inner arm and said mechanism forward and back, a centrally pivoted positioning lever having its outer arm operative to bear upon the outer arm of said actuating lever and thus to so move forward the inner arm of the actuating lever and to withdraw the control of the actuating lever from said motor arm, means locking said member in the position caused or maintained by said positioning lever, and means for subsequently unlocking said member and restoring the control of said actuating arm to said motor arm.

39. In combination an operable member, a forward locking device having a catch locking said member on a back movement thereof, a back locking device having a catch locking said member on a forward movement thereof, intermediate mechanism on being moved forward operating through said forward locking device to unlock its catch from said member and to move the member forward with a quickness independent of the rate of motion of the mechanism and on being moved back operating through said back locking device to unlock its catch from said member and to move the member back with a like quickness, a centrally pivoted actuating lever having its inner arm operative to move forward said mechanism if in a back position or to maintain it in a forward position if already there, a motor arm for moving said inner arm and said mechanism forward and back, a centrally pivoted positioning lever having its outer arm operative to bear upon the outer arm of said actuating lever and thus to so move forward the inner arm of the actuating lever and to withdraw the control of the actuating lever from said motor arm, means locking said member in the position caused or maintained by said positioning lever, and means for subsequently unlocking said member and restoring the control of said actuating arm to said motor arm.

40. In combination an operable member, motion transmitting mechanism on being moved forward operating to move said member forward with a quickness independent of its own rate of motion and on being moved back operating to move the member back with a like quickness, an actuating arm operative to move forward said mechanism if in a back position or to maintain it in a forward position if already there, a motor arm for moving said actuating arm and said mechanism forward and back, positioning means for causing said actuating arm to so operate and to withdraw the control thereof from said motor arm, means locking said member in the forward position caused or maintained by said positioning means, and means for subsequently unlocking said member and restoring the control of said actuating arm to said motor arm.

41. In combination an operable member, motion transmitting mechanism on being moved forward operating to move said member forward with a quickness independent of its own rate of motion and on being moved back operating to move the member back with a like quickness, a centrally pivoted actuating lever having its inner arm operative to move forward said mechanism if in a back position or to maintain it in a forward position if already there, a motor arm for moving said inner arm and said mechanism forward and back, a centrally pivoted positioning lever having its outer arm operative to bear upon the outer arm of said actuating lever and thus to so move forward the inner arm of the actuating lever and to withdraw the control of the actuating lever from said motor arm, means locking said member in the position caused or maintained by said positioning lever, and means for subsequently unlocking said member and restoring the control of said actuating arm to said motor arm.

42. In combination a movable member, a locking device having a catch locking said member on a back movement thereof, means on being moved forward operating on said device to unlock its catch from said member, and means for moving said former means forward and back.

43. In combination a movable member, a forward locking device having a catch locking said member on a back movement thereof, a back locking device having a catch locking said member on a forward movement thereof, forward means on being moved forward operating on said forward device to unlock its catch from said member, back means on being moved back operating on said back device to unlock its catch from said member, and means for moving said former means and member forward and back.

GEORGE P. CARROLL.
FRANK N. ROEHRICH.

Witnesses:
JOHN E. PRAGER,
JESSE H. SWIEDLER.